Sept. 14, 1937.  E. A. HORTON  2,092,745
DISPENSING DEVICE
Filed Jan. 20, 1936  2 Sheets-Sheet 1
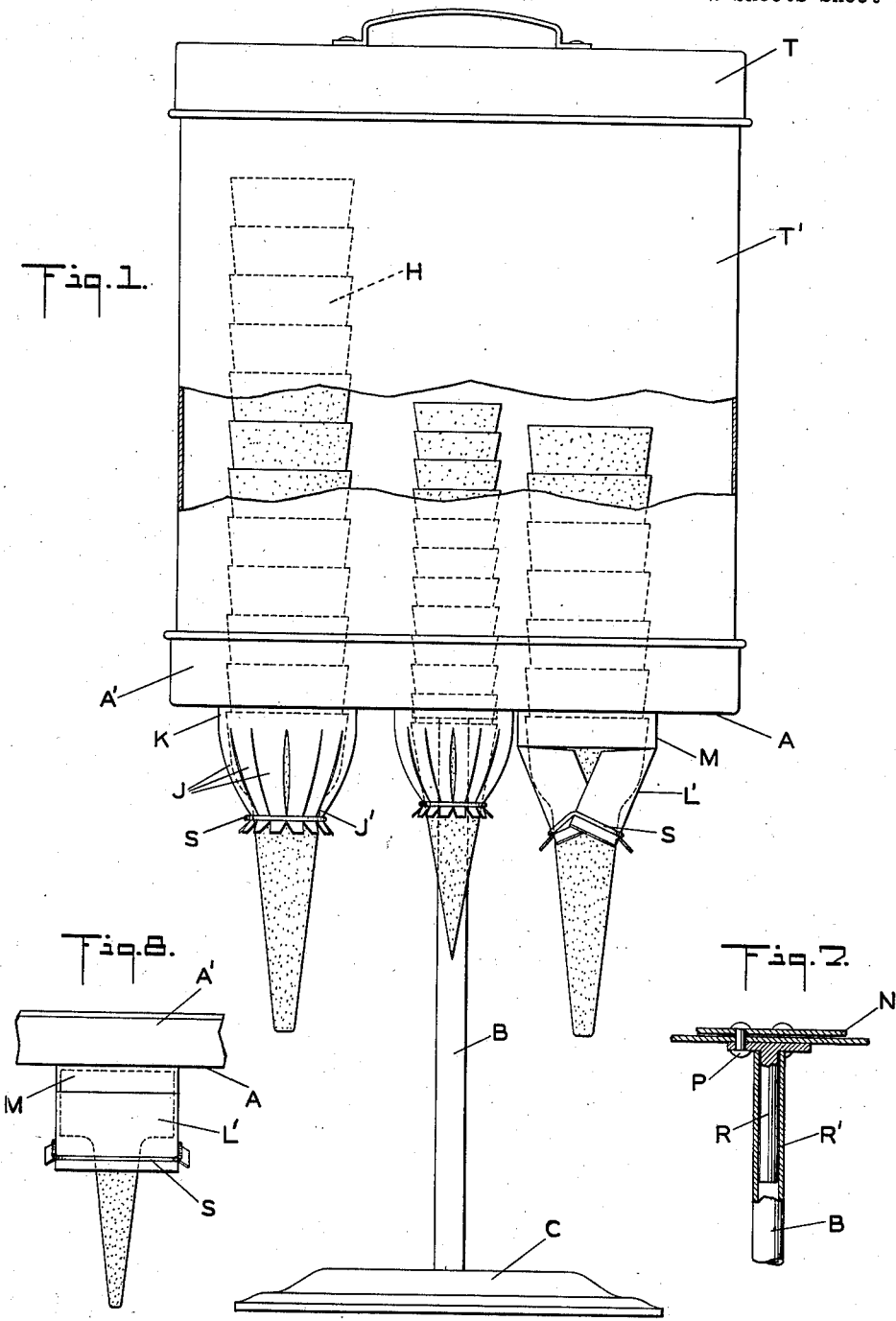
INVENTOR
ELLSWORTH A. HORTON
BY
Ralph E. Slayton
ATTORNEY Sept. 14, 1937.   E. A. HORTON   2,092,745
DISPENSING DEVICE
Filed Jan. 20, 1936   2 Sheets-Sheet 2
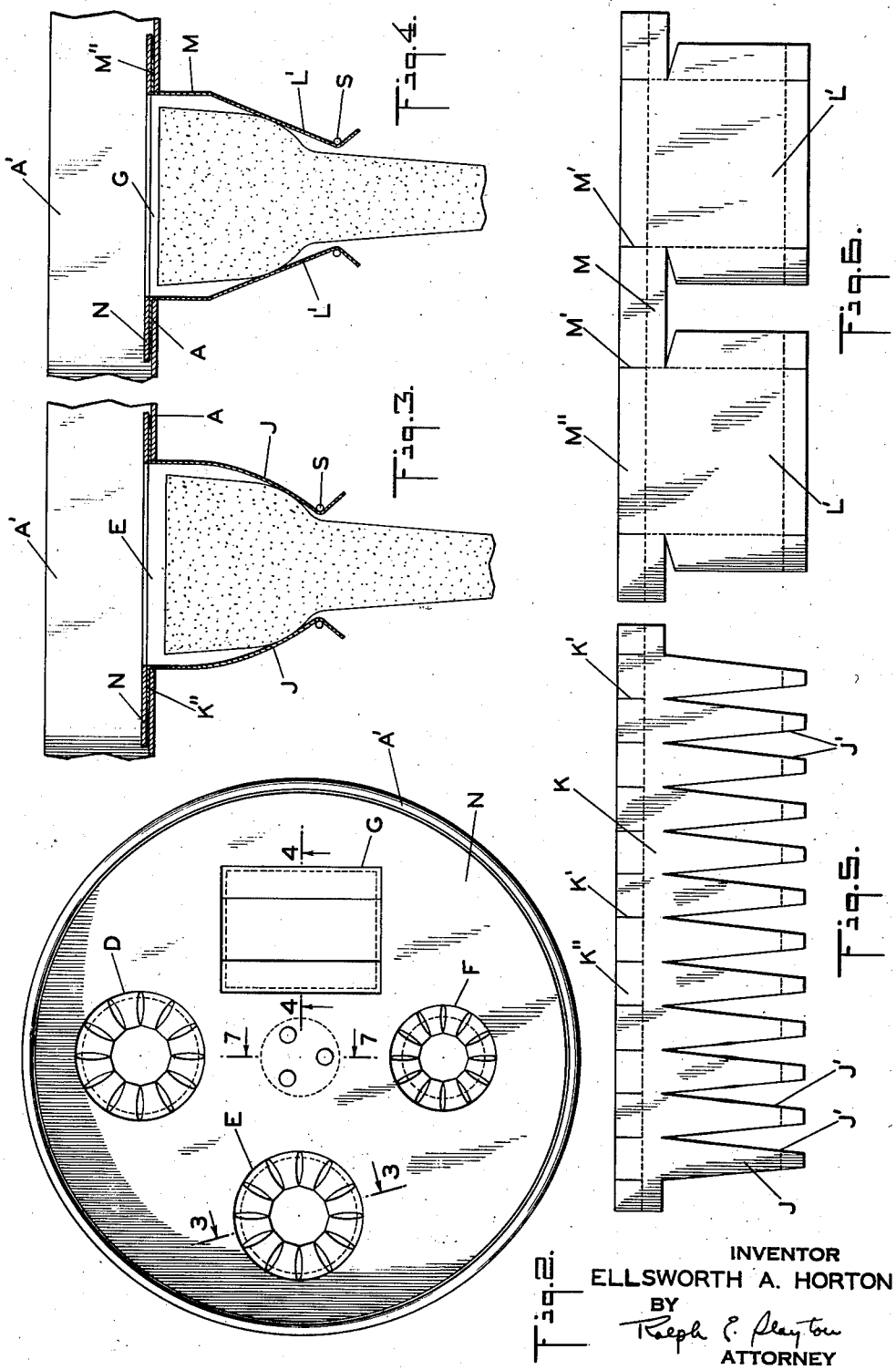
INVENTOR
ELLSWORTH A. HORTON
BY
ATTORNEY Patented Sept. 14, 1937

2,092,745

UNITED STATES PATENT OFFICE 2,092,745

DISPENSING DEVICE

Ellsworth A. Horton, New York, N. Y., assignor to The Cone Dispenser Corporation, New York, N. Y., a corporation of New York Application January 20, 1936, Serial No. 59,843

9 Claims. (Cl. 312—43)

This invention relates to dispensing devices and has more special reference to devices for dispensing fragile articles such as ice cream cones in a sanitary manner.

Ice cream cones generally consist of a more or less brittle baked edible material and are supplied to the trade in various more or less standardized shapes and sizes. The baked material of these cones soften if exposed to moisture and become, generally speaking, unfit for use.

One of the principal objects of the present invention is to afford a dispensing device in which the cones may be stored and guarded against deleterious changes in atmospheric conditions and conveniently dispensed in a sanitary manner.

Comprehensively stated the invention comprises an enclosed storage space in which the cones are arranged, for instance in stacked relation, so that only the lowermost cone is exposed and held in such position by mechanism which permits its convenient removal and the substitution of another cone without danger of breakage.

The characteristics and advantages of the invention are further sufficiently explained in connection with the following description of the accompanying drawings which show a representative embodiment. After considering this example, skilled persons in the art will understand that many variations may be made without departing from the principles disclosed and I contemplate employment of any structures that are properly within the scope of the appended claims.

In said drawings:—Fig. 1 is a side elevation of the invention partly fragmentary;

Fig. 2 is a horizontal section of the lower portion of the device;

Fig. 3 is a section of Fig. 2 on the line 3—3;

Fig. 4 is a section of Fig. 2 on the line 4—4;

Fig. 5 is a view of a blank illustrating the undeveloped construction of one of the dispensing units;

Fig. 6 is a view of a blank of another form of dispensing unit;

Fig. 7 is a section of Fig. 2 on the line 7—7, and

Fig. 8 is a fragmentary side elevation of one of the dispensing units.

Continuing now by way of a more detailed description, a turntable A having an upstanding peripheral flange A' forming a dish shaped member is journaled on the upper end of an upstanding post B in turn supported on a base C in a manner which will be more fully described hereinafter. This turntable A is provided with a plurality of radially disposed openings D, E, F and G, adapted to receive dispensing units of various shapes and sizes in accordance with the particular types of cone to be dispensed. Instead of a plurality of openings for receiving the dispensing units, it is to be understood that a single dispensing unit might also be employed. Irrespective of whether one or more dispensing units are associated with the turntable, the dispensing unit in general comprehends a plurality of dependant strips normally tending to move outwardly and having their lower ends held together to form a restricted opening to receive and seat a cone. The dependant strips are preferably flexible so as to permit outward movement of their lower ends when the cone seated in the restricted end is pulled downwardly and thereby affords a larger size orifice to permit discharge of the cone. Dispensing units having the flexible downward dependant cone engaging strips may be conveniently formed from blanks, for instance of the character as shown in Fig. 5. The particular blanks shown in this figure consist of a plurality of dependant flexible strips J, the adjacent edges J' of adjacent strips being cleared away in the manner illustrated so as to afford a continuous connecting strip K along their upper edge and at the same time afford abutting edges to prevent the strips, when their lower ends are brought together, from forming too small a discharge orifice so that the cone will not seat itself properly. The continuous strip K has a plurality of slits K' adapted to form laterally projecting flaps K" for securing the unit in place. The blank in Fig. 6 is a blank similar in construction to that shown in Fig. 5 having dependant members L' with a connecting strip M along their upper edges and slits M' to form laterally projecting flaps M" similar to the flaps K". The dispensing unit shown in Fig. 6 is illustrative of a form more particularly adapted for dispensing rectangular cones. The blanks are fitted in their respective openings in the turntable with the flaps K" or M" formed in the connecting strip bent at right angles so as to overlie the top surface of that portion of the turntable surrounding the opening. These outwardly extending flaps of the dispensing units are clamped in position by a plate N having a plurality of openings corresponding to those found in the turntable and registering therewith. The plate N may be and is fitted within the peripheral flange A'. The plate N and the bottom of the turntable are conveniently held together in any suitable manner, as for example, by rivets P or other equivalent arrangement. The rivet P not only holds the plate N in position to clamp the laterally extending flaps of the dispensing units heretobefore described but also to lock the plate N and turntable A to a rotatable bearing R journaled on a bearing R' formed at the upper end of the member B.

It will be noted the upper portion of the dispensing unit is secured between the plate N and turntable A with the flexible dependant strips extending below the lower surface of the turntable A and having their lower ends bent outwardly so as to retain a flexible ring member S in position to hold the dependant strips normally together and permit the strips to move outwardly to form a flexible expanding orifice for the cone to pass through when a downward pull is exerted on the lowermost cone.

A removable cover T closes one end of a container T' housing the stacked cones H and may be of any suitable material although preferably transparent to render visible the reserve cones available. The container T' has its lower circumferential edge resting on turntable A and serves to protect the reserve cones from moisture.

It is claimed:

1. A dispensing device including a dispensing unit comprising a plurality of oppositely disposed dependant members, said members being connected to each other by a continuous strip and tending to spring outwardly and having their lower ends bent outwardly and resilient means normally tending to move the members toward each other and retained in position by the outwardly bent lower ends of said members.

2. A dispensing device combining a turntable having a plurality of openings, object discharging units for each of said openings, said units consisting of oppositely disposed dependent members adapted to seat an object and movable relatively to each other to permit discharge of the object and having their upper edges bent outwardly so as to overlie the turntable and means to clamp the said upper edges to the turntable.

3. A dispensing device combining a turntable having a plurality of openings, object discharging units for each of said openings, said units consisting of oppositely disposed dependent members adapted to seat an object and movable relatively to each other to permit discharge of the object and having their upper edges bent outwardly so as to overlie the turntable and a clamping plate having a plurality of openings registering with the openings in the turntable and clamping the overlying edges of the units.

4. A dispensing device combining a turntable having a plurality of openings, object discharging units for each of said openings, said units consisting of oppositely disposed flexible dependant members adapted to seat an object and movable relatively to each other to permit discharge of the object and having their upper edges bent outwardly so as to overlie the turntable, a clamping plate having a plurality of openings registering with the openings in the turntable and clamping the overlying edges of the units to the turn table, the dependant members having their lower edges bent outwardly and means retained in position by the outwardly bent lower edges to normally move the members toward each other.

5. A dispensing device combining a turntable having a plurality of openings, object discharging units for each of said openings, said units consisting of oppositely disposed flexible dependant members adapted to seat an object and movable relatively to each other to permit discharge of the object and having their upper edges bent outwardly so as to overlie the turntable, a clamping plate having a plurality of openings registering with the openings in the turntable and clamping the overlying edges of the units to the turn table, the dependant members having their lower edges bent outwardly and means including a resilient ring retained in position by the outwardly bent lower edges to normally move the members toward each other and a closure adapted to rest on said turntable.

6. A dispensing device combining a plurality of dependent members tending to spring outwardly, means including a resilient ring for pressing said members toward each other to form a tapered opening, the dependent members having a striking edge limiting the inward movement of the members.

7. A dispensing device including a dispensing unit combining a plurality of circumferentially disposed dependent members tending to spring outwardly, said members being integrally formed with a continuous strip, with resilient means acting against the lower end of said members to normally press the ends of the members inwardly and thereby form a tapered object holder.

8. A dispensing device combining a plurality of circumferentially disposed members tending to spring outwardly having curved lower ends and resilient means cooperating with the curved lower ends to normally press the members inwardly and thereby form a tapered object holder having a discharge opening, the members being independently movable outwardly to form an enlarged opening to discharge the object.

9. A dispensing device including a dispensing unit combining a plurality of circumferentially disposed dependant members tending to spring outwardly with resilient means acting against the lower end of said members to normally press the members inwardly and thereby form a tapered object holder.

ELLSWORTH A. HORTON.